United States Patent [19]

Levingston

[11] Patent Number: 5,362,114
[45] Date of Patent: Nov. 8, 1994

[54] PIPE JOINT AND METHOD FOR FORMING SAME FOR THREADED CONNECTION OF PROFILE PIPE

[76] Inventor: Jerry C. Levingston, P.O. Box 1157, Steelville, Mo. 65565

[21] Appl. No.: 149,506

[22] Filed: Nov. 9, 1993

[51] Int. Cl.⁵ .................. F16L 15/04; F16L 13/10
[52] U.S. Cl. .................... 285/334; 285/92; 285/423; 285/355; 285/289; 285/138; 285/149; 269/152; 269/173; 156/304.2; 156/258; 138/109; 138/155
[58] Field of Search ............... 285/21, 92, 305, 333, 285/334, 355, 340, 423, 915, 289, 297, 138, 149, 251; 269/138, 152, 150, 173; 156/304.2, 195, 258; 138/109, 129, 154, 155, 97, 144, 147, 111, 113, 115, 116

[56] References Cited

U.S. PATENT DOCUMENTS

| | | | |
|---|---|---|---|
| 3,336,504 | 1/1968 | Hulterstrum | 117/37 |
| 3,453,006 | 7/1969 | Levake | 285/104 |
| 3,495,628 | 2/1970 | Boender | 138/154 |
| 3,917,500 | 11/1975 | Petzetakis | 156/195 |
| 3,926,223 | 12/1975 | Petzetakis | 138/129 |
| 4,014,568 | 3/1977 | Carter et al. | 285/39 |
| 4,130,162 | 12/1978 | Nelson | 166/243 |
| 4,154,466 | 5/1979 | Simmons | 285/334 |
| 4,280,534 | 7/1981 | Van Dongeren | 138/109 |
| 4,301,200 | 11/1981 | Langenfeld et al. | 138/148 |
| 4,428,591 | 1/1984 | Marissen et al. | 138/109 |
| 4,489,963 | 12/1984 | Raulins et al. | 285/350 |
| 4,531,551 | 7/1985 | Eichelberger et al. | 138/129 |
| 4,600,225 | 7/1986 | Blose | 285/334 |
| 4,611,837 | 9/1986 | Aleck | 285/305 |
| 4,702,502 | 10/1987 | Shade et al. | 285/903 |
| 4,749,192 | 6/1988 | Howeth | 285/86 |
| 4,779,902 | 10/1988 | Lee | 285/260 |
| 4,804,209 | 2/1989 | Fischer | 285/915 |
| 4,811,975 | 3/1989 | Paul, Jr. et al. | 285/305 |
| 5,015,014 | 5/1991 | Sweeney | 285/81 |
| 5,040,831 | 8/1991 | Lewis | 285/305 |
| 5,071,173 | 12/1991 | Hegler et al. | 285/138 |
| 5,078,430 | 1/1992 | St. Onge | 285/15 |
| 5,096,528 | 3/1992 | Durrenberger et al. | 138/109 |
| 5,106,130 | 4/1992 | Ellsworth et al. | 285/335 |
| 5,195,785 | 3/1993 | Jellison | 285/80 |

FOREIGN PATENT DOCUMENTS 668010 9/1964 Italy .................. 285/289

OTHER PUBLICATIONS

Sclairpipe, high density poleythylene pipe, KWH Pipe (Canada) Ltd., pp. 1, 12-14 and 19, Dec. 1990.

Primary Examiner—Eric K. Nicholson
Attorney, Agent, or Firm—Senniger, Powers, Leavitt & Roedel

[57] ABSTRACT

A pipe joint for first and second profile wall pipes of the type having generally concentric, spaced apart inner and outer walls, and a helical rib connecting the inner wall to the outer wall. The convolutions of the helical rib extend in multiple turns around the exterior of the inner wall and along the interior of the outer wall for substantially the entire length of the pipe. The pipe joint includes a first exposed portion of the rib of the first pipe, and a second exposed portion of the rib of the second pipe. The exposed helical rib of the first pipe is threadably interengaged with the exposed helical rib of the second pipe.

18 Claims, 6 Drawing Sheets

PIPE JOINT AND METHOD FOR FORMING SAME FOR THREADED CONNECTION OF PROFILE PIPE

BACKGROUND OF THE INVENTION

This invention relates generally to pipe joints and more particularly to a method and apparatus for forming a pipe joint.

Pipe made of polymericmaterial, such as polyethylene and polyvinylchloride, has numerous applications, such as in culverts, sewers, storm drains and for industrial piping, to name only a few. The use of polymeric pipe is advantageous because of its relatively low cost, light weight, strength and resistance to corrosion. The present invention has particular application to polyethylene pipe which is formed by extrusion to have an inner cylindrical wall, a generally concentric outer cylindrical wall and ribbing located between and connecting the inner and outer walls. The extruded pipe having the aforementioned construction is sometimes referred to in the industry as "profile wall" pipe. Profile wall pipe uses less material and is even lighter in weight than solid pipe made of polymeric material.

Profile wall pipe is extruded in lengths which are sufficiently short to permit transportation and handling. At the site where the pipe is to be installed, the shorter pipes are joined together to form a continuous piece of piping of a desired length. A common way of joining profile wall pipes and other pipes made of polymeric material is to fuse the pipes together. However, a special fusion machine is required to make the joint. The machine may cost $5,000 a day to operate and be able to join only about 200 feet of pipe during the day. Moreover, the joining operation must occur outside the trench where the piping is to be placed, requiring additional labor to move the pipe from the fusion machine to its final resting place.

SUMMARY OF THE INVENTION

Among the several objects and features of the present invention may be noted the provision of a method for forming a joint in profile wall pipe which permits pipe to be joined without special machinery; the provision of such a method which permits each pipe to be joined to the other in the trench where the pipe is to be finally placed; the provision of such a method which permits relatively large pipes to be joined together by one or two laborers; the provision of such a method which uses pre-existing structure of the pipes to form the joint; and the provision of such a method which is easy to carry out and produces a joint economically.

Further among the several objects and features of the present invention my be noted the provision of a joint element for a pipe which can be coupled with a mating joint element without special machinery; the provision of such a joint element which permits the joint to be made by one or two laborers without any special tools; the provision of such a joint element which is a part of pre-existing structure of the pipe; and the provision of such a joint element which is economical to make and requires no other elements separate from the pipe to make a joint.

Other objects and features of the present invention will be in part apparent and in part pointed out hereinafter.

BRIEF DESCRIPTION OF THE DRAWINGS

Corresponding reference numbers indicate corresponding parts throughout the several views of the drawings.

DETAILED DESCRIPTION OF THE PREFERRED EMBODIMENTS

Figure 1:
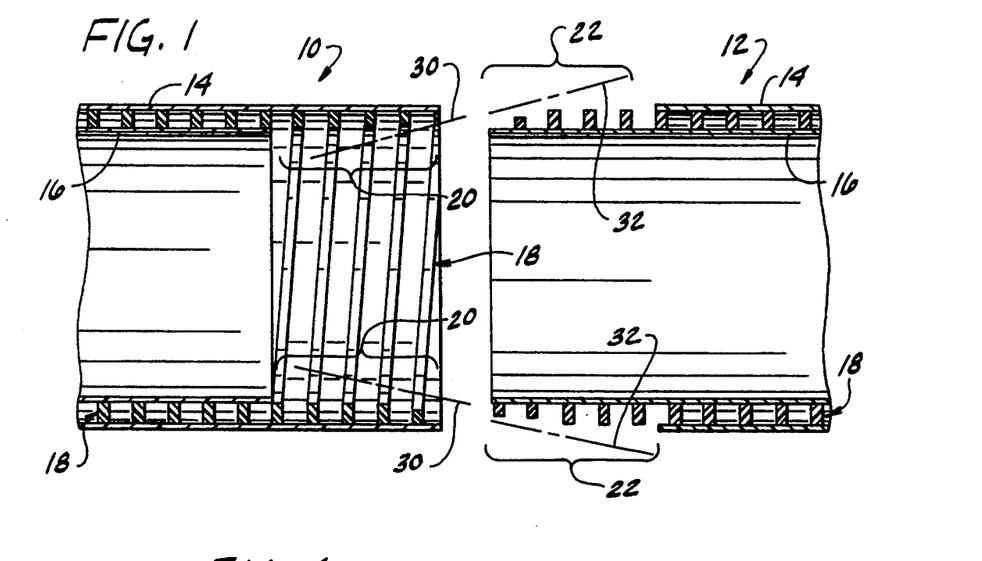
FIG. 1 is a longitudinal fragmentary section of two pipes showing their joint elements.

Referring now to the drawings, and in particular to FIG. 1, first and second profile wall pipes (designated generally at 10 and 12, respectively) are each shown to comprise an outer generally cylindrical wall 14, a substantially concentric cylindrical inner wall 16 and a helical rib (indicated generally at 18) located generally between the walls and joining the walls together. The convolutions of the rib 18 extend in multiple turns (each "turn" representing 360° of angular extension of the rib about the long axis of the pipe) around the exterior of the inner wall 16, and along the interior of the outer wall 14 for substantially the entire length of the pipe. Each pipe could have more than a single rib and still fall within the scope of the present invention. In the preferred embodiment, the profile wall pipe is polyethylene profile wall pipe manufactured by KWH Pipe (Canada) Ltd and sold under the trade name WEHOLITE. This pipe is formed by extrusion so that each length of pipe is one integral piece of material. In profile wall pipe formed by extrusion, the inner wall, outer wall and rib all extend the full length of the pipe. It is to be understood that the present invention is applicable to on other types of pipe, such as profile wall pipe formed in smaller sections and fused together into larger pipes.

The inner wall 16 of the first pipe 10 is axially recessed from the outer wall 14 at an end of the first pipe to expose a portion 20 of the helical rib 18 on the interior of the first pipe. The outer wall 14 of the second pipe 12 is axially recessed from the inner wall 16 at an end of the second pipe to expose a portion 22 of the helical rib 18 on the exterior of the second pipe. The exposed portions 20, 22 of the helical rib 18 on the first and second pipes 10, 12 constitute the joint elements of the pipe in the preferred embodiment. The opposite end of the first pipe (not shown) is preferably configured like the end of the second pipe 12 shown in FIG. 1, with the outer wall 14 being offset to expose a portion of the rib 18. In the same way, the opposite end of the second pipe (not shown) is preferably configured like the end of the first pipe 10 shown in FIG. 1, with the inner wall 16 axially offset. Thus, the first and second pipes 10, 12 are constructed for joining with other pipes of the same construction to form a length of piping of any desired length.

Figure 7:
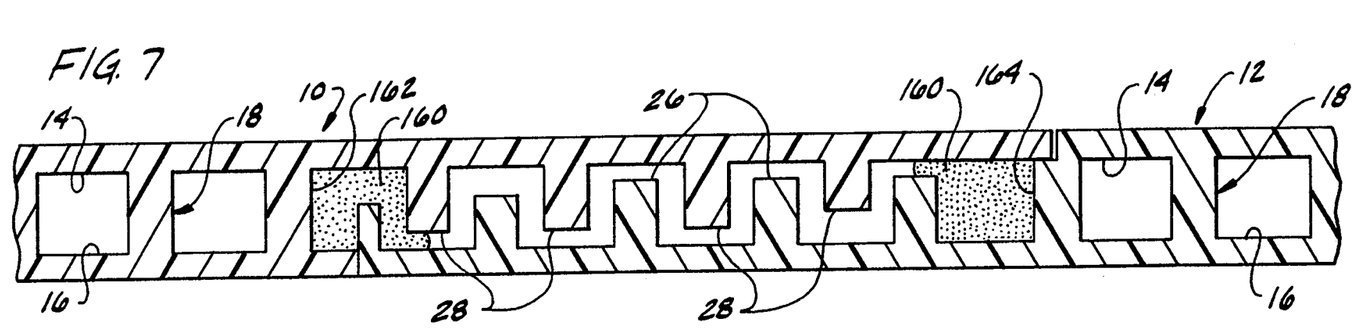
FIG. 7 is an enlarged fragmentary longitudinal section of joined pipes.

To join the pipes together, the end of the second pipe 12 is received in the end of the first pipe 10 so as to interengage the exposed portions 20, 22 of rib 18 of the respective pipes. The pipes 10, 12 are then rotated relative to one another in a counterclockwise direction and the ribs 18 act as threads of a turnbuckle to draw the pipes together until the outer walls 14 and/or inner walls 16 of the first and second pipes engage (FIG. 7). The direction of rotation is dictated by the configuration of the rib 18, and could be changed without falling outside the scope of the present invention. As joined together, at least a segment of the rib 18 of the second pipe 12 is interposed between axially adjacent turns of the rib of the first pipe 10 so that the pipes are held together. The segment of the rib 18 of the second pipe 12 interposed between adjacent turns of the rib of the first pipe 10 can be less than one full turn of the rib, but is preferably at least five full turns of the rib. As shown in FIG. 7, turns 26 of the exposed portion 22 of the rib of the second pipe 12 are interposed between adjacent turns 28 of the exposed portion 20 of the first pipe 10. The rib 18 of the first and second pipes 10, 12 may not be helical or continuous, but in accordance with the present invention the exposed ribs 20, 22 of the first and second pipes are shaped and arranged for interlocking engagement when the end of the second pipe is inserted into the end of the first pipe. Thus, unlike conventional joints which are separated from the pipe or formed into the pipe, the joint elements of the present invention employ pre-existing structure of the pipe.

In order to facilitate starting the threaded engagement of the first and second pipes 10, 12, the exposed ribs 18 in successive turns of the pipes increase in height in correspondence with their distance from the end of the corresponding pipe. As a result, the pipe openings are effectively tapered at their ends as indicated by lines 30 and 32, respectively, in FIG. 1. The first pipe 10 opens wider nearer its end, and the outer diameter of the second pipe 12 is narrowest at its end. Preferably, three turns of the exposed portions 20, 22 ribs of the first and second pipes are left at their full height to provide adequate holding force. Thus, in the illustrated embodiment only two turns are reduced in height with respect to the remaining turns of the exposed portions 20, 22 of the ribs.

Figure 2:
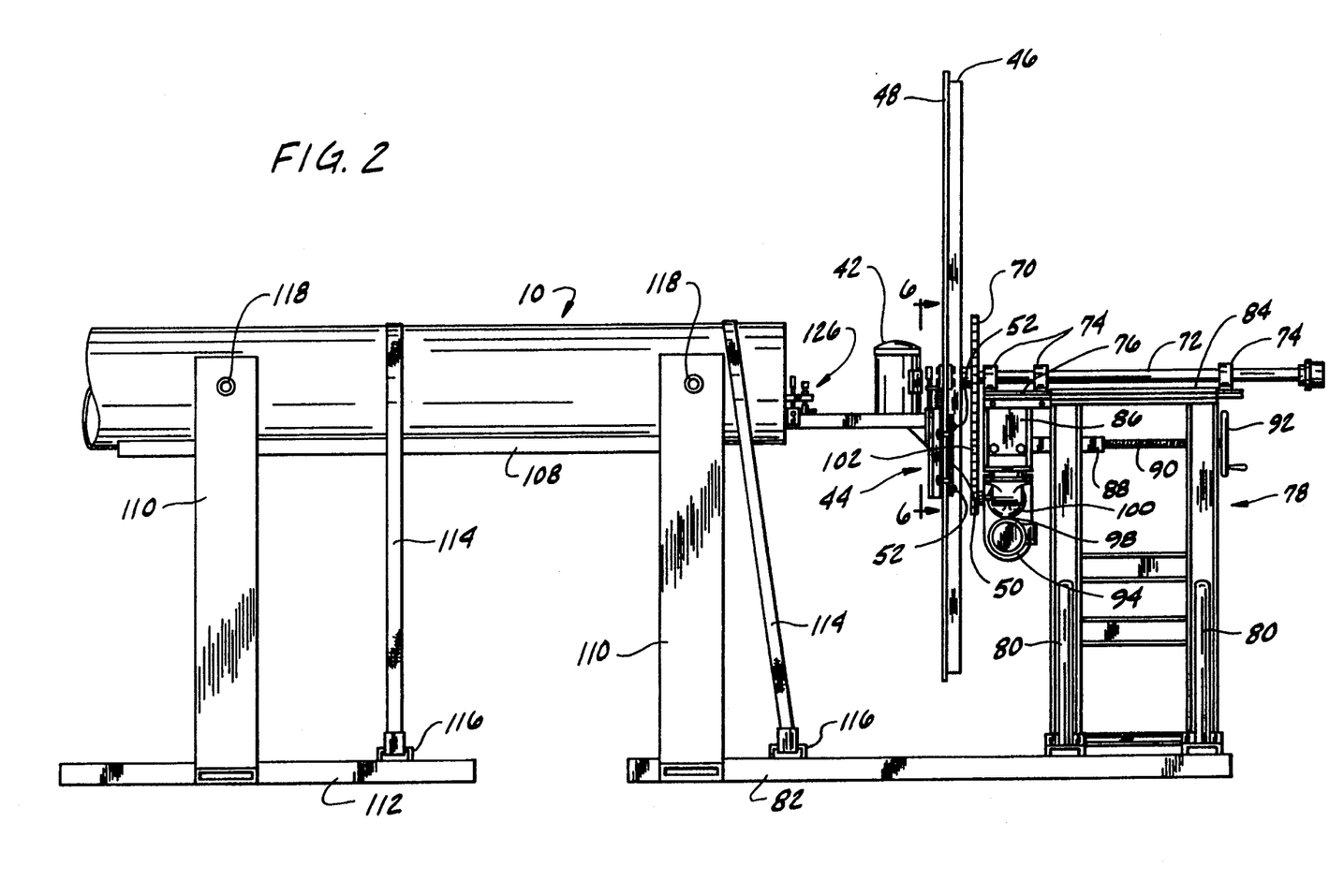
FIG 2 is a side elevation of apparatus for forming the join elements in the pipe.
Figure 3:
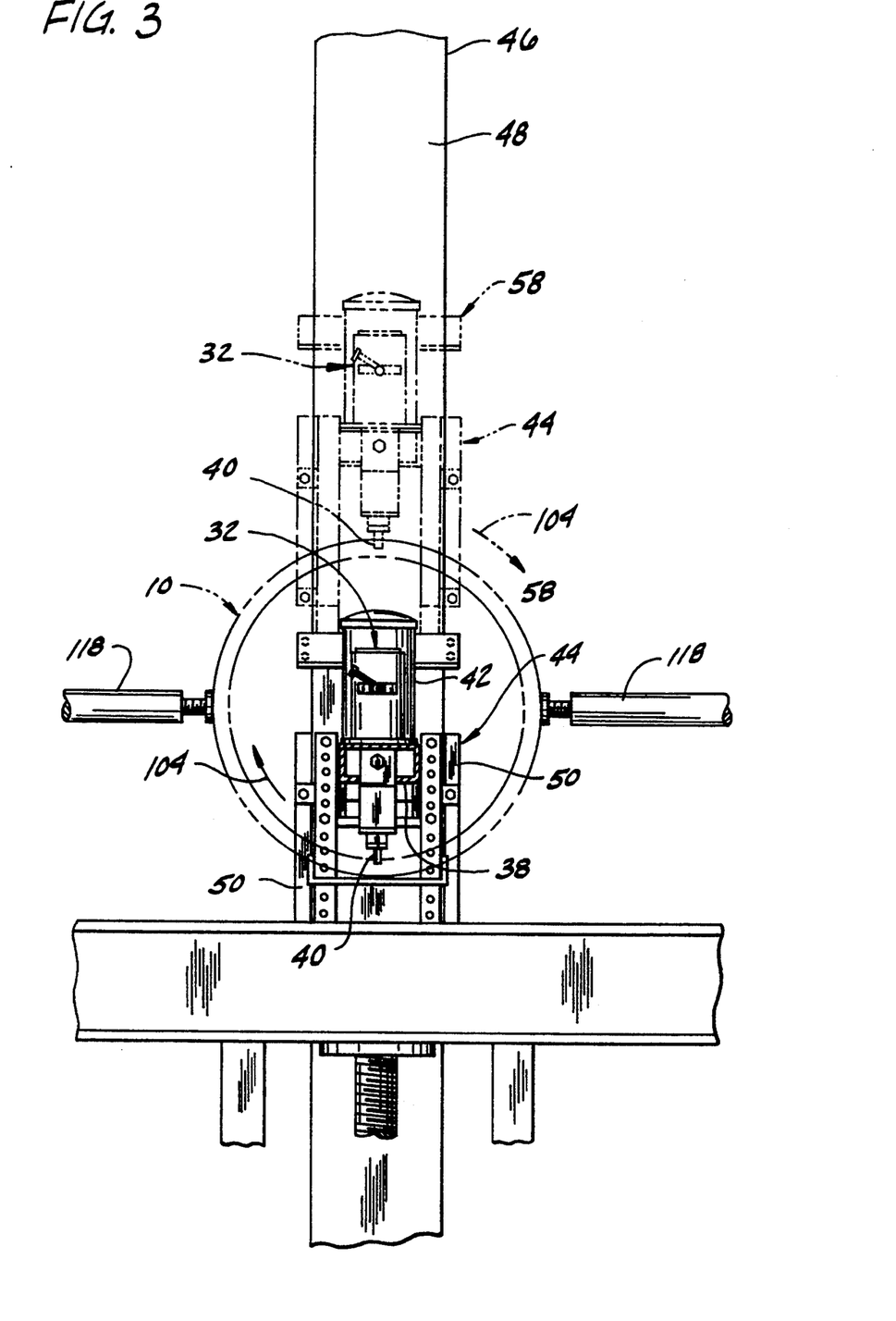
FIG. 3 is a fragmentary end elevation of the apparatus with portions of the apparatus removed for clarity in illustrating two positions of the apparatus' milling device.
Figure 4:
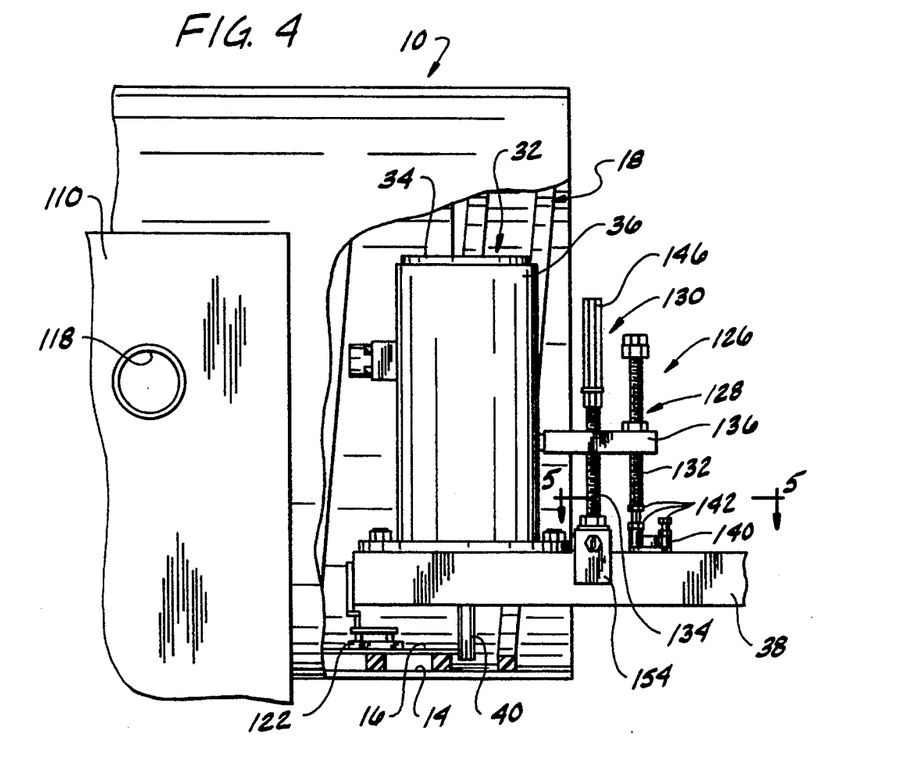
FIG. 4 is a fragmentary side elevation of a pipe and apparatus for forming a joint element of the pipe with a portion of the pipe broken away to show operation of the apparatus on the interior of the pipe.
Figure 6:
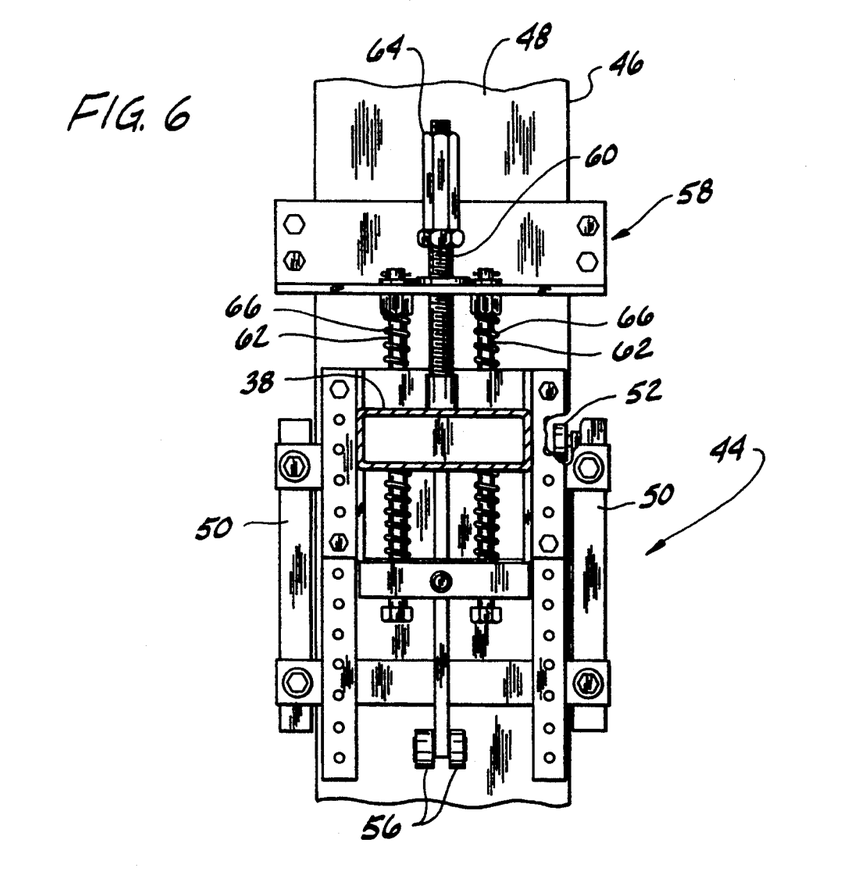
FIG. 6 is an enlarged, fragmentary section taken in the plane including line 6—6 of FIG. 2.

Apparatus for forming the joint elements in the first and second pipes 10, 12 is shown in FIGS. 2-4 to comprise a milling device, indicated generally at 32, including a housing 34 received for sliding motion in a sleeve 36 mounted on a elongate platform 38, and a bit 40 extending downwardly (as the milling device is oriented in FIG. 4) from the housing below the platform. A first electric motor 42 for driving the milling device 32 is also mounted on the platform 38 rearwardly of the milling device. The platform 38 is mounted at its rear end on a trolley (designated generally at 44) riding on a rail 46. The trolley 44 is connected to the rail 46 on a wide, forwardly facing flange 48 of the rail. As shown in FIG. 6, outboard portions 50 of the trolley 44 mount wheels 52 which engage the rearwardly facing portion of the flange 48 to hold the trolley on the rail 46. Another pair of wheels 54 are also positioned for rolling engagement with the forward face of the flange 48. The trolley 44 is held in a selected position by a clamp 58 capable of releasably gripping the rail 46. The trolley 44 is connected to the clamp 58 by a threaded rod 60 and two smooth rods 62. The threaded rod 60 is threadably engaged with the trolley 44 and extends through an opening (not shown) in the clamp 58 which is smaller than a head 64 of the threaded rod 60 but larger than the diameter of the threaded rod. Thus, the threaded rod 60 would permit the trolley 44 to move relative to the clamp 58 over a distance equal to the separation between the lower end of the head 64 and the trolley. Springs 66 received around the smooth rods 62 bear against the clamp 58 and against the trolley 44 and act to push the trolley away from the clamp. The rail 46 is attached to a large sprocket gear 70 on the end of a shaft 72 supported for rotation in three pillow blocks 74 mounted on a slide support 76 held by a stand (designated generally at 78) which supports the slide support, sprocket gear, rail, trolley 44 and platform 38 in a cantilever fashion. The stand 78 has four legs 80 (only two of which are shown) each pair of which are mounted on a respective base member 82 (only one is shown).

The slide support 76 is captured by retainers 84 on the top of the stand, and can be moved relative to the stand to be selectively extended toward and retracted from the pipe 10. A bracket 86 depending from the forward end of the slide support 76 is connected by way of an internally threaded sleeve 88 to a screw 90 supported between front and rear pairs of the legs 80. A wheel crank 92 mounted on the rear end of the screw 90 permits an operator to turn the screw to move the slide support 76 forwardly or rearwardly as desired. Although the movement of the slide support 76 is controlled manually in the illustrated embodiment, it is to be understood that motors and automatic electronic controllers (not shown) may also be used. The depending bracket 86 also mounts a second electric motor 94 connected to a gear box 96, and from an output shaft 98 of the gear box 100 by a chain 102 to the large sprocket gear 70. Activation of the motor causes the large sprocket gear, shaft 72 and rail 46 to rotate about the longitudinal axis of the shaft. The platform 38 and milling device 32, which are located at a distance from the longitudinal axis of the shaft 72, thus orbit about the axis. In this way, the milling device 32 is moved around the circumference of the pipe 10 for milling away the inner wall 16 or outer wall 14 of the pipe as indicated by arrows 104 in FIG. 3.

As shown in FIGS. 2–4, the apparatus is set up for milling the inside of the pipe 10. However, as shown in phantom in FIG. 3, the milling device 32 may be positioned to mill the outside of the pipe 10. To change the location of the milling device 32 for milling the outside of the pipe 10, the clamp 58 is loosened from the rail 46 and the trolley 44 and clamp are moved radially outwardly farther from the longitudinal axis of the shaft 72. The clamp 58 is then re-secured to the rail 46 to hold the trolley 44 (and hence the platform 38 and milling device 32) in the new location.

The pipe 10 on which a joint element is to be formed is mounted in on a channel 108 supported by spaced apart stanchions 110 connected to the base member 82 and another base member 112. Only the stanchions 110 and base members 82, 112 on one side of the apparatus are shown in FIG. 2, the stanchions and base members on the opposite side of the apparatus being of substantially identical construction. To hold the pipe 10 in place during the milling operation, it is secured by straps 114 extending over the pipe at spaced apart locations and secured on respective sides of the apparatus by members 116 to the base members 82, 112. The connection of the straps 114 to the base members 82, 112 on only one side of the apparatus is shown in FIG. 2, the connection on the opposite side being identical. As shown in FIG. 3, rods 118 extending from laterally opposite stanchions 110 engage the pipe 10 (shown in phantom) to hold the pipe from becoming out of round during the milling operation.

As shown in FIG. 4, a foot 112 fixedly attached to the forward end of the platform 38 engages the inner wall 16 of the pipe 10. The clamp 58 is positioned so that the foot 122 actually pushes the trolley 44 against the biasing force of the springs 66 a short distance toward the clamp so the foot bears against the inner wall 16 of the pipe with the force of the springs and the weight of the trolley, platform, motor 42 and milling device 32. Even when the milling device is in an inverted position, the force of the springs causes the foot to bear against the inner wall. Thus, the foot acts to hold the platform 38 at a fixed distance from the inner wall 16. Of course if the apparatus is set up as shown in FIG. 3, the foot 122 holds the platform 38 a fixed distance from the outer wall 14. The spring connection of the trolley 44 to the clamp 58 permits the entire platform 38 to move slightly as the foot 122 travels around the inner (or outer) circumference of the pipe 10 and follows its contour.

Figure 5:
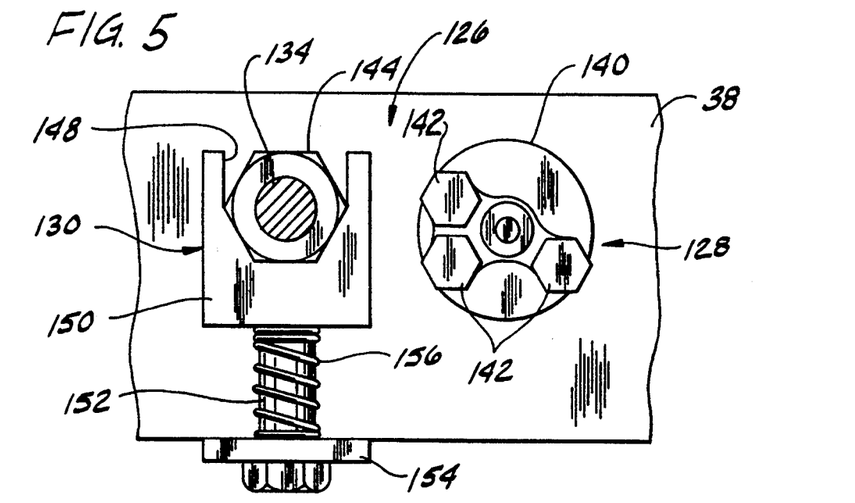
FIG. 5 is an enlarged fragmentary section taken in the plane including line 5—5 of FIG. 4.

The depth of the cut made by the milling device 32 into the pipe 10 is determined by depth control means indicated generally at 126. Referring now particularly to FIGS. 4 and 5, the depth control means 126 includes a course depth control member 128 and a fine depth control member 130, each of which includes a bolt (designated 132 and 134, respectively) threadably engaged in a rigid arm 136 connected to the milling device housing 34. The lower ends of the bolts 132, 134 are operatively engageable with the platform 38 for holding the milling device 32 at a fixed location relative to the platform. The location of the milling device 32 determines the distance the bit 40 extends below the platform 38, and hence sets the depth of the cut the bit makes into the pipe 10. The course depth control member 128 further includes a pedestal 140 having three bolt rests 142 positioned at different distances from the platform 38. To change the rest 142 which is engaged by the bolt 132, the pedestal 140 is rotated to bring another rest underneath the bolt. Thus, course adjustment of the depth of the cut can be rapidly made. The bolt 134 of the fine depth control member 130 has a hexagonal nut 144 connected at its lower end. An elongate hexagonal head 146 at the top of the bolt 134 facilitates gripping the bolt to turn it for fine adjustment of the depth of the cut. The nut 144 is received in a polygonal cutout 148 in a locking block 150. In this embodiment, the walls of the locking block 150 defining the cutout 148 conform to the shape of the nut 144 so that three sides of the nut engage three corresponding walls of the locking block in the cutout in face-to-face relation. The locking block 150 is mounted on the platform 38 by a smooth bolt 152 slidably secured to a tab 154 connected to the platform. The locking block 150 and smooth bolt 152 will slide laterally of the platform 38 if sufficient force is applied to overcome the bias of a spring 156 on the bolt which urges the locking block against the nut 144. When sufficient force is applied to the bolt 152 by twisting the head 146, the nut 144 pushes the locking block 150 away from it toward the tab 154. As the walls of the cutout 148 move away from the nut 144, it is free to turn until three sides of the nut are again in registration with the walls of the locking block 150 in the cutout 148 and the locking block snaps back against the nut. In this way precise 60° turns of the bolt 134 are made to produce correspondingly small, precise steps of the depth control of the cut. In operation of the apparatus, the locking block 150 and spring 156 hold the fine adjustment bolt 134 from turning as a result of vibrations during the operation.

Having described the apparatus, a method for forming the pipe joint elements on pipe is explained. The method will be explained with reference to the aforementioned apparatus, but it is to be understood that the method my be carried out by other than this apparatus and still fall within the scope of the present invention. As stated above, the method is particularly adapted for use with profile wall pipe, and produces a pipe having an integral joint element which can be joined with a corresponding joint element on another pipe without the use of fusing machinery or couplings which are separate from the pipes.

The pipe 10 on which the joint element is to be formed is loaded onto the channel 108 and secured in place by fastening the straps 114 around the pipe as described above. The rods 118 projecting from the stanchions 110 are adjusted to bring them into engagement with the outer wall 14 of the pipe 10. If necessary, the location of the milling device 32 can be changed by moving the trolley 44 as previously explained. To mill the inside of the pipe 10 the foot 122 on the forward end of the platform 38 is brought to rest on the inner wall 16 of the pipe near the end with the bit 40 adjacent to the end of the inner wall. The electric motors 42, 94 are activated and the milling device 32 begins orbiting around the interior circumference of the pipe 10 as the bit 40 cuts away the inner wall 16. The milling device 32 is gradually moved axially inwardly into the pipe 10 to remove a predetermined cylindrical segment of the inner wall 16. As the inner wall 16 is cut away, a portion 20 of the rib 18 is exposed to the interior of the pipe 10. The depth of the cut is initially set so that not only is the inner wall 16 removed, but the ribs 18 are cut down from their original height. As the milling device 32 progresses axially into the pipe 10, the depth of the cut is gradually lessened by operation of the depth control means 126 to form the taper of the pipe opening described above. Usually, at least about three turns of the rib 18 are left with the same, substantially full height.

After a sufficient number of turns of the rib 18 have been exposed, the milling device 32 is stopped and withdrawn from the pipe 10 by turning the wheel crank 92 to retract the slide support 76. The pipe 10 can be removed from the channel 108 and a new pipe (e.g., second pipe 12) placed on the channel for milling. To remove the outer wall 14 from the second pipe 12, the milling device 32 is repositioned by moving the trolley 44 to the position shown in phantom in FIG. 3. The foot 122 connected to the platform 38 rests on the outer wall 14. Removal of a cylindrical segment of the outer wall 14 is carried out in substantially the same way as removal of the inner wall 16 of the first pipe 10 described above. The depth of the cut on the outer wall 14 is gradually reduced as the milling device 32 moves inwardly so that the turns of the rib 18 increase in height away from the end and the outer diameter of the pipe 10 is narrowest at that end.

The end of the first pipe 10 opposite that shown in FIG. 1 is typically milled to form an exterior joint element substantially identical to the exterior joint element formed at the illustrated end of the second pipe. Likewise, the end of the second pipe 12 opposite that shown in FIG. 1 is typically milled to form an interior joint element substantially identical to the interior joint element formed in the illustrated end of the first pipe 10. The process is then repeated for as many pipes as desired. The precise order in which the pipes are milled may be other than described above and still fall within the scope of the present invention.

The first and second pipes 10, 12, so formed, are joined by inserting the end of the second pipe into the first pipe until the leading turns of the exposed portions 20, 22 of the ribs 18 engage. The pipes 10, 12 are then rotated relative to one another so that the ribs 18 draw them together. For many applications pipe formed with the joint elements as described can be screwed together with no additional sealant. However, for certain applications it is desirable to have better seal than can be provided by engagement of the ribs 18 of the first and second pipes 10, 12. One type of sealed joint is illustrated in FIG. 7 of the drawings, in which a sealant and adhesive 160 is deposited in a groove 162 between the axially innermost exposed turn of the rib 18 and the adjacent, unexposed rib turn of the first pipe 10. The sealant/adhesive 160 is likewise placed in a groove 164 of the second pipe 12 between the axially innermost exposed rib turn and the adjacent unexposed rib. As the first and second pipes 10, 12 are threaded together the leading portion of the rib 18 of the second pipe 12 engages and compresses the sealant/adhesive 160 deposited in the first pipe 10 at the same time the leading portion of the rib of the first pipe engages and compresses the sealant/adhesive deposited in the second pipe. In this way the pipes 10, 12 are further sealed and held together by action of the sealant/adhesive 160. The sealant/adhesive 160 could be a butyl mastic, or other suitable material such as a polymeric, elastomeric, cementitious, rubber or other grout. It is also possible to use an elastic solid preformed to fit into the groove of one or both of the pipes 10, 12. Other possible sealant-/adhesives are water activated elastomeric foam, and electrofusion cable (not shown). These sealant/adhesives can be placed in selected grooves between turns of the ribs 18 of the first and/or second pipes 10, 12 (as shown in FIG. 7) or in all of the grooves after the first and/or second pipes. As one example, the first and second pipes 10, 12 may be started in threaded interengagement and sealant is then placed as by caulking into the entire remaining exposed groove of the second pipe. The use of electrofusion cable (i.e., cable which by conduction of electricity fuses the pipes together) permits a permanent fusion of the pipes without use of a fusion machine.

Figure 8:
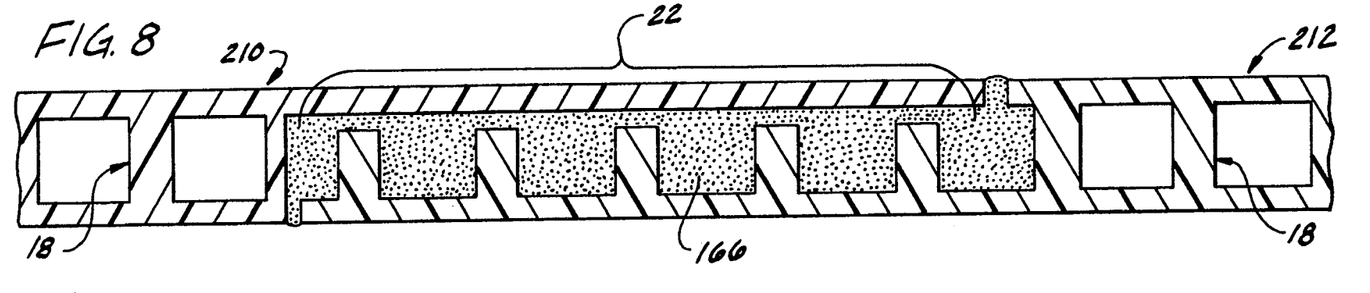
FIGS. 8 and 9 are enlarged fragmentary longitudinal sections of joined pipes, illustrating a second embodiment of joint.
Figure 9:
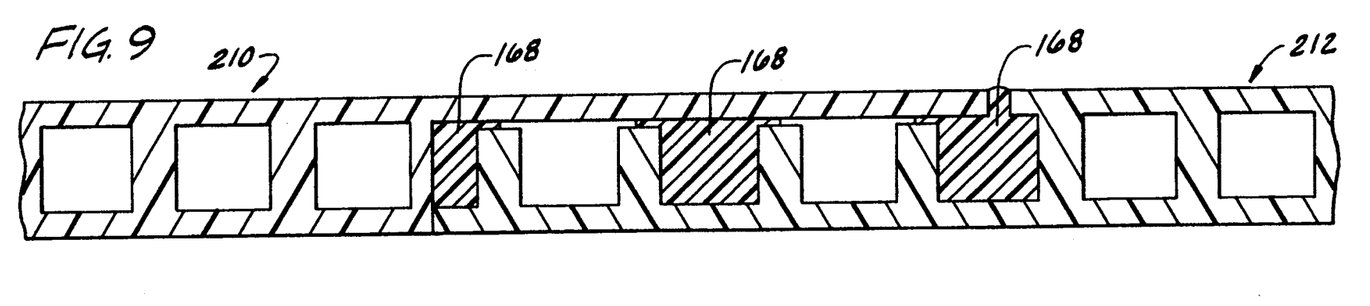

In joints of a second embodiment of the present invention (shown in FIGS. 8 and 9), segment of the rib 18 of the first pipe 210 under the under the inner wall 16 is entirely removed at the same time the inner wall is removed leaving only the outer wall 14 at that end of the first pipe. The exposed portion 22 of the rib of the second pipe 12 is the same as in the first embodiment, except that the turns of the exposed ribs are all left the same height. In the illustrated embodiment of FIG. 8, a sealant/adhesive 166 is placed in substantially the entire exposed groove of the second pipe 12. In FIG. 9, gaskets 168 are disposed in selected turns of the groove of the second pipe 12. The second pipe 12 can be inserted axially into the first pipe 210 without rotation. The sealant/adhesive 166 or the compression of the gaskets 168 by the outer wall 14 of the first pipe 210 provides a holding force in this embodiment. The joints illustrated in FIGS. 8 and 9 may also rely upon the weight of the earth thrown on top of the pipes 10, 12 to bury them to hold the pipes together. However, the exposed portion 22 of the ribs 18 of the second pipe 12 project like fingers into the sealant/adhesive 166, and securely hold the gaskets 168. Thus, the exposed ribs 22 permit a substantially stronger bond than could be achieved with use of the sealant/adhesive 166 or gaskets 168 on a smooth pipe joint. It is to be understood that the exposed ribs of the first pipe 210 could be left in place and the exposed ribs 22 of the second pipe 12 removed and still fall within the scope of the present invention.

Figure 10:
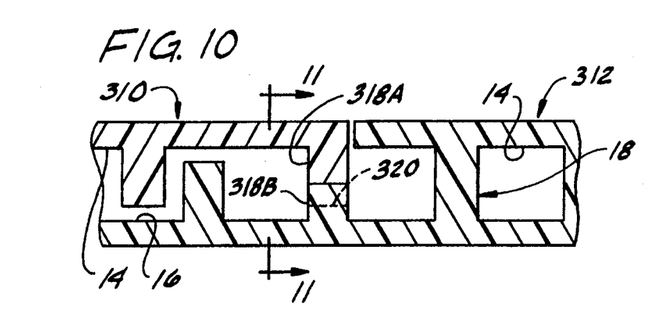
FIG. 10 is an enlarged fragmentary longitudinal section of joined pipes of a third embodiment having a snap-lock feature.
Figure 11:
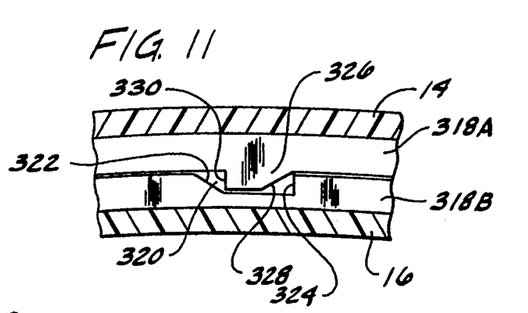
FIG. 11 is a cross section of the pipe joint taken as indicated by line 11—11 of FIG. 10.

A third embodiment of the joint of the present invention, shown in FIGS. 10 and 11, includes a snap locking feature which prevents the first and second pipes 310, 312 from being disconnected by unscrewing the pipes. The pipes 310, 312 of the third embodiment are similar to the pipes 10, 12 of the first embodiment in that they are capable of threaded interengagement as shown in FIG. 10. However, in the third embodiment, the axially outermost turn 318A of the exposed portion 20 of the rib of the first pipe 310 and the axially innermost turn 318B of the exposed portion 22 of the rib of the second pipe are cut down so that the axially outermost turn of the first pipe rides up on the axially innermost turn of the second pipe. The axially outermost turn 318A does not ride up on the axially innermost turn 318B until the pipes 310, 312 are threaded together nearly as far as permitted. When the axially innermost turn 318A of the first pipe 310 rides up on the axially outermost turn 318B of the second pipe 312, the pipes are resiliently deflected in opposite radial directions.

The axially innermost turn 318B of the exposed portion 22 of the rib of the second pipe 312 has at least one notch 320 formed in it. The notch 320 is defined by one sloping wall 322 and another wall 324 which intersects the bottom of the notch at right angles. The axially outermost turn 318A of the rib of the first pipe 310 is formed with a locking hub 326 which projects radially inwardly from the remaining portions of the turn. The hub 326 has a sloping wall 328 and another wall 330 which intersects the remainder of the turn 318A at right angles. The hub 326 is adapted to snap into the notch 320 when brought into registration with the notch. Once the nub 326 is received in the notch 320 it prevents counter-rotation (i.e., rotation in a clockwise direction in the illustrated embodiment) to unscrew the pipes 310, 312.

Figure 12:
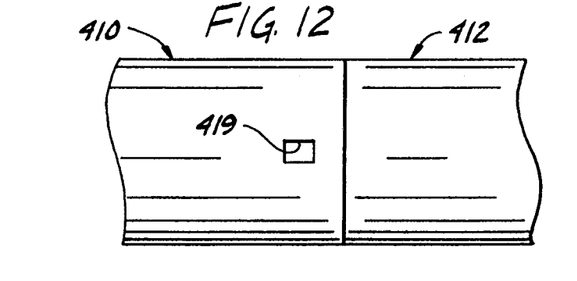
FIG. 12 is an fragmentary elevation of a pipe joint showing a joint of a fourth embodiment.
Figure 13:
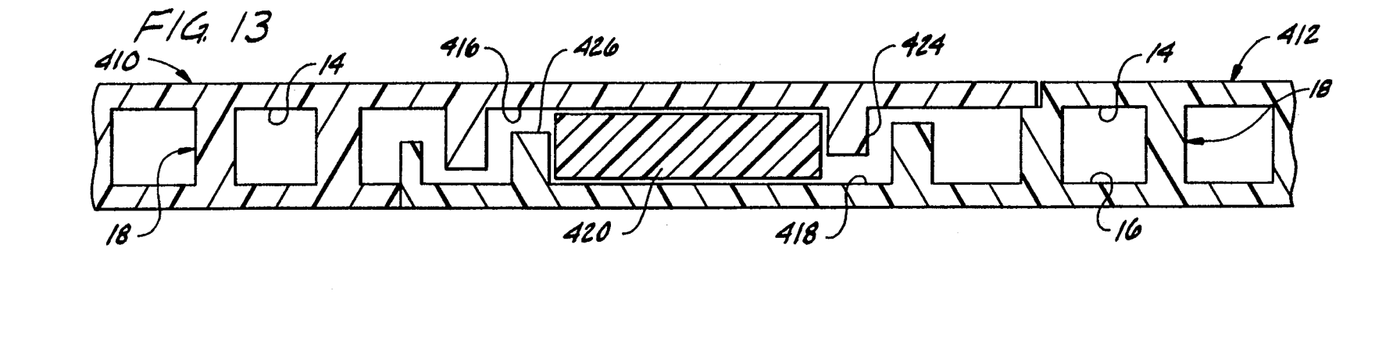
FIG. 13 is an enlarged fragmentary longitudinal section of the joined pipes of FIG. 12.

In a fourth embodiment of the present invention, shown in FIGS. 12 and 13, several turns in approximately the middle of the exposed portions 20, 22 of the ribs of the pipes 410, 412 are removed leaving a channel 416 which extends circumferentially around the outer wall 14 of the first pipe and a channel 418 which extends circumferentially around the inner wall 16 of the second pipe. Several turns of the exposed portions 20, 22 of the ribs of the pipes 410, 412 are left at axially opposite ends of the exposed portions. As shown in FIG. 12, at least one opening 419 is formed in the outer wall 14 of the first pipe 410 directly over the channel 416.

When the pipes 410, 412 are screwed together as shown in FIG. 13, the channels 416, 418 are generally aligned to create an annular cavity extending around the joint. An elongate, flexible ribbon stop 420 is pushed through the opening 418 and into the cavity defined by the channels 416, 418. As disposed in the cavity, the ribbon stop 420 prevents disconnection of the pipes 410, 412. As may be seen in FIG. 13, the ribbon stop 420 is located between a turn 424 of the rib of the first pipe 410 and a turn 426 of the rib of the second pipe 412. Motion of the pipes 410, 412 apart from each other causes the turns 424, 426 to engage the ribbon stop 420, thereby preventing further movement of the pipes in a direction away from each other.

The joints illustrated in FIGS. 7–13 all permit the interior wall of the piping formed by connection of the first and second pipes in all of the joint embodiments to extend through the joint without change in interior diameter or smoothness of the interior wall. Thus, the presence of the joint does not significantly affect (e.g., such as by the introduction of turbulence) the flow of liquid in the piping through the joint. Moreover, the exterior diameter of the piping also remains the same at the joint, unlike presently existing internal bell and spigot connections (not shown) in which a portion of one pipe is inserted into the other to form the joint. Typically, the outer diameter of the pipe forming the female portion of the joint has a larger diameter than the reminder of the pipe.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for forming a pipe joint on pipe having generally concentric, spaced apart inner and outer walls, and rib means connecting the inner wall to the outer wall, the method comprising the steps of removing the inner wall of a first pipe at an end thereof, and removing the outer wall of a second pipe at an end thereof to expose a portion of said rib means to the exterior of the second pipe, said end of the second pipe being adapted for reception in said end of the first pipe for joining the first and second pipes.

2. A method as set forth in claim 1 wherein the step of removing the inner wall of the first pipe comprises the step of cutting away the inner wall to expose a portion of said rib means, and wherein upon reception of said end of the second pipe into said end of the first pipe at least a segment of said exposed rib means of the second pipe is interposed between axially adjacent portions of said exposed rib means of the first pipe thereby to lockingly interengage the first and second pipes.

3. A method as set forth in claim 2 further comprising the steps of removing the outer wall of the first pipe at an opposite end thereof to expose another portion of said rib means of the first pipe, and removing the inner wall of the second pipe at an opposite end thereof to expose another portion of said rib means of the second pipe whereby said first and second pipes are adapted for interengagement at said opposite ends with other pipes of the same construction to form a desired length of continuous piping.

4. A method as set forth in claim 2 wherein the inner wall of the first pipe and outer wall of the second pipe are removed to expose multiple turns of said helical rib means, and wherein the method further comprises the step of cutting at least some turns of said exposed helical rib means of the first and second pipes to different heights such that the height of the turns of said at least some turns increases in correspondence to the distance of each turn from the end of the respective pipe.

5. A method as set forth in claim 2 further comprising the steps of inserting the end of the second pipe into the end of the first pipe and rotating the first and second pipes relative to each other to threadably interengage said exposed rib means of the first pipe with said exposed rib means of the second pipe.

6. A method as set forth in claim 1 further comprising the steps of depositing an adhesive in at least some of the turns of the groove of the second pipe, and inserting said end of the second pipe into said end of the first pipe, said rib means of the second pipe gripping the adhesive for holding said end of the second pipe in said end of the first pipe.

7. A method for forming a pipe joint on pipe having generally concentric, spaced apart inner and outer walls, and rib means connecting the inner wall to the outer wall, the method comprising the steps of removing a cylindrical segment of the inner wall of a first pipe at an end thereof, removing a cylindrical segment of the outer wall of a second pipe at an end thereof, and selectively removing a portion of said rib means from one of the first and second pipes along with the cylindrical segment of the inner or outer wall, said end of the second pipe being adapted for reception in said end of the first pipe for joining the first and second pipes.

8. A pipe joint for first and second profile wall pipes, each profile wall pipe comprising generally concentric, spaced apart inner and outer walls, and rib means connecting the inner wall to the outer wall, the pipe joint comprising a first portion of said rib means of the first pipe which extends axially outwardly from an end of the inner wall and is exposed radially inwardly of the first pipe, and a second portion of said rib means of the second pipe which extends axially outwardly from an end of the outer wall and is exposed radially outwardly of the second pipe, said radially inwardly exposed rib means of the first pipe being threadably interengaged with said radially outwardly exposed rib means of the second pipe.

9. A pipe joint as set forth in claim 8 wherein the height of said radially inwardly exposed rib means of the first pipe and the height of said radially outwardly exposed rib means of the second pipe increases generally in correspondence to the distance of said rib means from said end of the corresponding pipe.

10. A pipe joint as set forth in claim 8 wherein said rib means comprises for each of the first and second pipes a continuous helical rib extending substantially the full length of the pipe, the convolutions of the rib extending in multiple turns around the exterior of the inner wall and along the interior of the outer wall.

11. In combination, a first profile wall pipe and a second profile wall pipe joined together to form a length of piping, the first and second profile wall pipes each comprising an outer generally cylindrical wall, a substantially concentric cylindrical inner wall, and rib means connecting the inner and outer walls, the inner wall of the first pipe being axially recessed from the outer wall at an end of the first pipe to expose a portion of said rib means on the interior of the first pipe, the outer wall of the second pipe being axially recessed from the inner wall at an end of the second pipe to expose a portion of said rib means on the exterior of the second pipe, said end of the second pipe being disposed in said end of the first pipe with at least a segment of said exposed portion of said rib means of the second pipe being interposed between axially adjacent portions of said exposed portion of said rib means of the first pipe thereby to join the first and second pipes.

12. The combination set forth in claim 11 wherein the height of said exposed rib means of the first pipe and the height of said exposed rib means of the second pipe increases generally in correspondence to the distance of said rib means from said end of the corresponding pipe.

13. The combination as set forth in claim 11 wherein said rib means comprises for each of the first and second pipes a continuous helical rib extending substantially the full length of the pipe, the convolutions of the rib extending in multiple turns around the exterior of the inner wall and along the interior of the outer wall.

14. A profile wall pipe having an integral joint element comprising an outer generally cylindrical wall, a substantially concentric, cylindrical inner wall, and rib means connecting the inner and outer walls, the outer wall and inner wall being axially offset to expose a portion of said rib means at one end of the pipe, said exposed rib means being adapted for locking interengagement with exposed helical rib means of another pipe for forming a joint.

15. A profile wall pipe as set forth in claim 14 wherein the height of said exposed rib means of the pipe increases generally in correspondence to the distance of said rib means from said end of the pipe.

16. A profile wall pipe as set forth in claim 15 wherein said rib means comprises a continuous helical rib extending substantially the full length of the pipe, the convolutions of the rib extending in multiple turns around the exterior of the inner wall and along the interior of the outer wall.

17. The pipe joint as set forth in claim 8 further comprising:
a ribbon stop cavity, the top of the cavity being generally defined by the outer wall of the first profile wall pipe, the bottom of the cavity being generally defined by inner wall of the second profile wall pipe, one side of the cavity being generally defined by a segment of said rib means of the first profile wall pipe and the opposite side of the cavity being generally defined by a segment of said rib means;
an elongate ribbon stop made of flexible material disposed in the cavity, the ribbon stop being adapted to prevent withdrawal of the second profile wall pipe from the first profile wall pipe by engagement with said rib mean segments; and
an opening in the outer wall of the first profile wall pipe in communication with the cavity, the ribbon stop having been inserted into the cavity after the second profile wall pipe was inserted into the first profile wall pipe.

18. The pipe joint asset forth in claim 8 further comprising a snap locking mechanism operable to inhibit relative rotation of the first and second profile wall pipes in a direction which would result in the pipes threadably disengaging one from the other, said snap locking mechanism comprising an outwardly opening notch in the axially innermost turn of said exposed rib means of the second profile wall pipe, and a radially inwardly projecting hub on the axially outermost turn of said exposed rib means of the first profile wall pipe, the hub being adapted to ride up on said axially innermost turn of said exposed rib means of the second profile wall pipe upon threaded interengagement of the first and second profile wall pipes and to snap into the notch upon registration of the nub with the notch.

* * * * *